United States Patent
Isenmann et al.

(10) Patent No.: US 7,685,267 B2
(45) Date of Patent: Mar. 23, 2010

(54) METHOD AND SYSTEM FOR CONNECTING TO A FIELD DEVICE

(75) Inventors: Andreas Isenmann, Haslach i.K. (DE); Fridolin Faist, Oberwolfach (DE); Ralf Schaetzle, Fischerbach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 11/588,123

(22) Filed: Oct. 25, 2006

(65) Prior Publication Data
US 2007/0100995 A1 May 3, 2007

Related U.S. Application Data

(60) Provisional application No. 60/730,713, filed on Oct. 27, 2005.

(30) Foreign Application Priority Data
Oct. 27, 2005 (DE) ................. 10 2005 051 580

(51) Int. Cl.
G06F 15/173 (2006.01)
G06F 15/177 (2006.01)
G06F 15/16 (2006.01)

(52) U.S. Cl. .................. 709/223; 710/305; 702/127; 700/19; 700/83

(58) Field of Classification Search ......... 709/217–228; 710/305; 702/127; 700/19, 83
See application file for complete search history.

(56) References Cited

U.S. PATENT DOCUMENTS

| 6,906,638 | B2 * | 6/2005 | Gaiser | 340/870.07 |
|---|---|---|---|---|
| 7,024,508 | B2 * | 4/2006 | Gros et al. | 710/305 |
| 7,035,877 | B2 * | 4/2006 | Markham et al. | 707/200 |
| 7,082,340 | B2 * | 7/2006 | Fehrer et al. | 700/83 |
| 7,116,237 | B2 * | 10/2006 | Kopp | 340/626 |
| 7,243,027 | B2 * | 7/2007 | Ireland et al. | 702/6 |
| 2002/0116548 | A1 * | 8/2002 | Feist | 709/330 |
| 2003/0101023 | A1 * | 5/2003 | Shah et al. | 702/186 |
| 2003/0195934 | A1 * | 10/2003 | Peterson et al. | 709/206 |

(Continued)

FOREIGN PATENT DOCUMENTS

DE 100 29 448 1/2002

(Continued)

OTHER PUBLICATIONS

Kapsalis et al., Seamless Integration of Distribution Real Time Monitoring and Control Applications Utilising Emerging Technoogies, IECON 01: The 27th Annual Conf. Of the IEEE Industrial Electronics Society, 2001, pp. 176-181.

(Continued)

Primary Examiner—Haresh N Patel
(74) Attorney, Agent, or Firm—Fay Kaplun & Marcin, LLP

(57) ABSTRACT

A communication module for a measuring instrument may include a first interface, a second interface, and an integrated web client. To the first interface a measuring instrument can be connected, whereas to the second interface a database can be connected. The communication module is configured to receive at the first interface a measurement value and to forward it to the second interface by the web client.

14 Claims, 8 Drawing Sheets

U.S. PATENT DOCUMENTS

| | | | |
|---|---|---|---|
| 2004/0019259 A1* | 1/2004 | Brown et al. | 600/300 |
| 2004/0255017 A1 | 12/2004 | Jurisch et al. | |
| 2005/0021705 A1* | 1/2005 | Jurisch | 709/223 |
| 2005/0120070 A1* | 6/2005 | Griech et al. | 709/200 |
| 2005/0143863 A1* | 6/2005 | Ruane et al. | 700/276 |
| 2005/0187732 A1* | 8/2005 | Rauer et al. | 702/127 |
| 2005/0198229 A1* | 9/2005 | Casteel | 709/221 |
| 2006/0075085 A1* | 4/2006 | Borg | 709/224 |
| 2007/0213846 A1* | 9/2007 | Da Silva Neto | 700/19 |

FOREIGN PATENT DOCUMENTS

| | | |
|---|---|---|
| DE | 101 63 565 | 12/2003 |
| WO | 03/023541 | 3/2003 |
| WO | 03/038533 | 5/2003 |
| WO | 03/040882 | 5/2003 |

OTHER PUBLICATIONS

Steinfeld, "Internet-Appliance Technology Automates Test Equipment", Electrical Design News, 1 vol. 45, No. 21, Oct. 12, 2000, pp. 157-169.

Hamrita et al., "Advances in Smart Sensor Technology", IEEE, 2005 Industrial Application Conf., Hong Kong, China, Oct. 2005, pp. 2059-2062.

* cited by examiner

```
                                            config_inc.php
<?php
    $g_hostname       = "localhost"
    $g_port           = 3306;   #  3306 is default
    $g_db_unsename    = "root";
    $g_db_password    = " ";
    $g_database_name  = "vmi ";
?>
```

Fig.6 vmi_input.php

```php
<html>
<HEAD>
<link rel="STYLESHEET" href="styles.css">
<title>VMI@ICE</title>
</HEAD>
<body border="0" bgcolor="#ffffff">
<?php
    require_once("config_inc.php");
    $db = mysql_connect ($g_hostname, $g_db_username, $g_db_password);
    if(!$db)
        {
            die("Error connecting to the Server");
            exit;
        }
    $result = mysql_select_db ($g_database_name, $db)
    if( !$result )
    {
        die ("Error selecting Database");
        exit;
    }

//INSERT INTO 'values' ('sernum', 'chanel', 'tag', 'val', 'unit', 'date_time')
VALUES ('12345678' , '1', 'Sensor', '3,5', 'm', '2005-04-14 16:30:15');

$sernum = $_GET ["sernum"];
    $channel = $_GET["channel"];
    $tag = $_GET["tag"];
    $va l = $_GET["val"];
    $unit = $_GET["unit"];
    $date_time = $_GET["date_time"];

$query = "INSERT INTO vmi_data (sernum, channel, tag, val, unit, date_time)";
    $query = $query. "VALUES (' ".$sernum." ',' ".$channel." ',' ".$tag." ',
' ".$val." ',' ".$unit." ',' ".$date_time." ');";
    $result = mysql_query ($query);

echo "Done (".$result."). <br>";
    echo "Query: ".$query;
?>
</body> </html>
```

Fig.7

Index.php

```php
<html>
<HEAD>
<link rel= "STYLESHEET" href="styles.css">
<title>VMI@ICE</title>
</HEAD>

<body border= "0" bycolor="#ffffff">

<?php
    require_once( 'config_inc.php' );

$db=mysql_connect ($g_hostname, $g_db_username, $g_db_password);
    if(!$db)
    {
        die ("Error connecting to the Server");
        exit;
    }
    $result=mysql_select_db($g_database_name, $db);
    if(!$result)
    {
        die("Error selecting Database");
        exit;
    } echo "<table border=\"1\">";

$query="SELECT * from vmi_data";
    $result=mysql_query($query);
    if(!$result)
        die("Error in query: ".$query."/->".$result);
    while($row=mysql_fetch_row($result))
    {
        echo "<tr> <td>" . $row[0] . "</td>\n";
        echo "<td>"      . $row[1] . "</td>\n";
        echo "<td>"      . $row[2] . "</td>\n";
        echo "<td>"      . $row[3] . "</td>\n";
        echo "<td>"      . $row[4] . "</td>\n";
        echo "<td>"      . $row[5] . "</td>\n";
        echo "<td>"      . $row[6] . "</td>\n";
        echo "\t</tr>\n";
    }
    echo "</table>";
    // Freigeben des Resultats
    mysql_free_result($result);
?>
</body> </html>
```

Fig.9

METHOD AND SYSTEM FOR CONNECTING TO A FIELD DEVICE

PRIORITY CLAIM

This application claims the benefit of the filing date of U.S. Provisional Patent Application No. 60/730,713 filed Oct. 27, 2005 and of German Patent Application No. 10 2005 051 580.0 filed Oct. 27, 2005, the disclosures of which are hereby incorporated herein by reference.

FIELD OF THE INVENTION

The present invention relates in general to the technical field of metrology. In particular, the present invention relates to a communication module for a measuring instrument, a database, a measurement value logging system, a method for processing measurement values, and a measuring instrument assembly.

TECHNOLOGICAL BACKGROUND

When logging measurement values it is very often decisive to relate measurement values of various process quantities in order to obtain evaluations based thereon. In this case, it happens frequently that measurement values have to be picked up at different locations, which are often spaced very far apart, and have to be transferred to a centralized location for storage. Using centralized storage allows for instance for a uniform data backup concept to be used for different measurement values. Furthermore, it is possible to make available only one evaluation infrastructure for treating all kinds of measurement results.

Conversion of the physical process information into measurement values, which can be evaluated by electronic data processing units, usually takes place at the measurement site. The field units convert the physical process information into numerical values, which must finally be forwarded to the centralized evaluator units.

Nowadays, transmission of process information from field units into a centralized database of an evaluator unit takes place e.g. via dialup connections, web servers integrated into field units, per email, SMS or by facsimile transmission. In all of these methods, in order to reach the measurement information, information has to be retrieved actively from a receiver. That is, measurement values are provided by the field unit at a location agreed upon, where they must then be fetched by the user, in particular by a subsequent processing instance.

In order to facilitate fetching, it is indeed possible to use polling procedures, which ensure that the information provided is interrogated and fetched at regular time intervals. However, with such polling procedures, or with fetching procedures triggered by the user, it is rather difficult to fetch information immediately after it has been logged. Especially with irregular measurement value logging, it may happen that the time interval between interrogation and provision of a measurement value is very long. Or it may happen that interrogation is done in intervals that are too short so that the measuring system is additionally loaded with frequent interrogation and performance thereof is impaired.

SUMMARY OF THE INVENTION

There may be a need to provide an improved provision of measurement values.

Accordingly, a communication module for a measuring instrument, a database, a measurement value logging system, a method for processing measurement values, and a measuring instrument assembly with a measuring instrument and a communication module having the features according to the independent patent claims are proposed.

According to an exemplary embodiment of the present invention, a communication module for a measuring instrument with a first and a second interface and a web client is proposed. At the first interface, a measuring instrument can be connected. Via the second interface, communication between the communication module and a database can be set up.

The communication module is configured so as to forward a measurement value received at the first interface by a web client to the second interface and to provide it thereat.

A web client may be an application communicating with a web server. Most of the time, a web client uses for communication with a web server the so-called Hypertext Transfer Protocol (HTTP). With respect to this document, a web client may also supposed to mean a process, which is configured to be performed on a processor as a stand-alone unit or integrated into a global system and which controls communication between two systems. Control information for the behavior of the web client may be taken from stored software.

Upon execution of a measurement, the web client may recognize that a valid measurement value is present. It may provide the measurement value, which is provided via the first interface of the communication module, after internal processing of the measurement value at the communication module, to a database via the second interface. The measurement value or other information related to the measurement, e.g. address identification numbers of the measuring instrument, the time of measurement or the duration of a measurement, may herein be transmitted directly into the database or into a storage device of the database.

By using a web client and the acknowledgement mechanisms available therewith for data transmission, the success of a measurement value transmission may be monitored, and in case of an error, the communication module may react appropriately. E.g. in case of an error due to incorrect transmission, which may be caused by transmission disturbances, repetition of information sending may be performed.

According to another exemplary embodiment of the present invention, a database with an interface and a server is proposed. Herein the database interface is configured in such a way that it is suitable for connection or communication with a web client. The database can receive a measurement value, which is dispatched by the communication module, in particular by the web client integrated on the communication module. According to an alternative exemplary embodiment, a database comprises an interface, wherein the database is adapted to be coupled to a communication module according to an exemplary embodiment of the invention, wherein the interface is adapted to provide a communication between the database and a web client of the communication module and wherein the database is further adapted to receive a measurement value, which is dispatched by the communication module.

In other words, this means that the database interface may be adapted to an interface of the communication module in order to be able to receive information dispatched by the communication module. In this respect, adaptation may mean not only physically adapting the interface, and in particular the interfaces of the database and the communication module to each other, but adaptation may also relate to the possibility of interpreting and extracting information dispatched by the communication module. This may concern the interpretation of information, which mostly occurs on a higher level interface layer or protocol layer.

At the communication module and the database, inverted process steps as for sending may be performed for communication. While the communication module is packing messages, in particular measurement values, according to a predefined rule into a form adapted for transmission, the database, in particular a server, may in turn extract this information according to corresponding rules. Thus, communication in the direction from communication module to database may take place, but also in the opposite direction.

For communication of the database in the direction of the communication module, a database server may take charge of packing a message and dispatching the message, whereas the web client at the communication module may unpack the message received. The rules, according to which the communication between communication module and database is taking place, may be deposited in mutually adapted scripts or programs.

According to another exemplary embodiment of the present invention, a measurement value logging system with at least one communication module and at least one database is provided. The measurement value logging system is configured in such a way that the communication module provides measurement values to the database by a web client.

By using a measurement value logging system, reliable or fault-tolerant transmission of information between communication module and database may be achieved.

Via the web client, the communication module and the database may communicate. Thereby, reliable transmission of measurement values between communication module and database may be made, and the interface between communication module and database may be adapted flexibly to new demands.

According to another exemplary embodiment of this invention, a method for processing measurement values by a communication module is provided. For executing the method, a measurement value is received at a first interface and forwarded by a web client to at least a second interface.

Further embodiments of the method result from the embodiments of the communication module and the database.

According to another exemplary embodiment of the present invention, a measuring instrument assembly is provided. The measuring instrument assembly comprises a measuring instrument for logging at least one measurement value. Furthermore, the measuring instrument assembly comprises a communication module, to which at least one measurement value can be supplied at the first interface.

The measuring instrument assembly with a communication module may enable direct access to measurement values of a measuring instrument. Frequently, between a measuring instrument, which may log a measurement value, and e.g. an evaluating unit, which may edit the measurement value logged, it may be necessary to use a bus system for communication between measuring instrument and evaluating unit. For this purpose, it may be necessary for the measurement value to be converted into a specific bus signal. If a measuring instrument assembly comprises the measuring instrument and the communication module, then the communication module may directly access the measurement values of the measuring instrument via a bus without intermediate conversion. The communication module may be integrated into the measuring instrument assembly, or it may be integratable e.g. by a screwed plug. Thereby, even existing measuring instruments may be upgraded and retrofitted.

According to another exemplary embodiment of this invention, a communication module is provided, wherein the first interface is an interface internal to a measuring instrument. With other words, the first interface is adapted in such a way that it is able to communicate with an interface integral to the measuring interface.

With an interface inside the measuring instrument the communication module may directly access measurement signals made available by the measuring instrument or a measuring unit. It may thus be avoided that the signals have to be converted into another transmission format. Conversion may be required e.g. for linking to the communication module a measuring instrument very far from the communication module. For this purpose, it might be necessary to connect the remote measuring instrument e.g. via a bus protocol, such as the HART® bus protocol. Due to provision of an interface inside the measuring instrument it may not be necessary to rely on a standard protocol for transmission.

According to another exemplary embodiment of the present invention, a communication module is provided, wherein the first interface is selected from the group consisting of 12C, HART®, Profibus, Fieldbus Foundation™, and VEGA VBUS.

If the first interface is a standard measurement value transmission protocol, various measuring instruments may be linked to the communication module. For example, it may be necessary to use standard measuring transmission protocols for the first interface in order to connect measuring instruments from different manufacturers to the communication module. With respect to the present document, an interface is to refer not only to a physical plug, but is also to comprise the protocol running through the physical link. Use of for instance a script is also to be included therein.

According to another exemplary embodiment of the present invention, a communication module is provided, wherein the second interface is written in a script language. This may involve higher level layers of a transmission protocol or an interface. The writing (Beschreibung) of an interface by using a script language may allow for flexible adaptation to a communication party of the communication module. For example, for communication with a database, the communication module may be obliged to provide certain information. The demand for type, sequence, and number of the information to be transmitted may change. By using or programming an interface by a script, which can be loaded onto the communication module and can be executed e.g. by the web client of the communication module, flexible adaptation to the database may be enabled.

The second interface of the communication module may be e.g. a standard http interface, which delivers the data to be transmitted as a URI (Uniform Resource Identifier) in form of a single command line at http communication setup. In such a command line, various parameters, as e.g. time of measurement, a serial number or a measurement value, can be coded. Writing the second interface in a script language may thus be the rule for the web client, according to which a hypertext transfer protocol line should be constructed by the web client, and is to be transmitted to a communication party. In other words, the second interface, which is written in a script language, may provide a rule for the web client, according to which a hypertext transfer protocol line should be constructed by the web client, and is to be transmitted to a communication party. Calls in HTTP can be processed and understood by currently usual networks without adaptation.

According to another exemplary embodiment of the present invention, a communication module is provided, wherein the communication module can be connected to the database via a communication medium. A communication medium can be a telephone network, a direct link, or else the Internet. Depending on the respectively selected communication link, different transmission hardware can be implemented. A direct link can be made e.g. by a null modem or in general a cross-over cable for the RJ 45 or RS 232 standard. If the communication module is to be connected to a telephone network, then modems for digital signal transmission may be required. If the communication medium is to be connected to the Internet, a TCP/IP socket software will usually be implemented.

According to another exemplary embodiment of the present invention, a communication module is provided, that is configured for forwarding the measurement value in an event-driven way.

Event control may be designed in many ways. Examples for event control are the provision of a measurement value at a given time, on a given day, or within a given interval. Events which may trigger event control may also be e.g. measuring errors or the presence of a measurement value after finishing of a measurement. Also, falling below or exceeding a given measurement value may trigger event control.

According to another exemplary embodiment of the present invention, a communication module is provided, wherein the web client is designed as a software module. Designing a web client as a software module may enable the possibility that during the life of the communication module improvements can be made and even merged into the software of the web client. Thereby, the web client can be adapted to new software versions, without the whole communication module having to be replaced.

According to another exemplary embodiment of the present invention, a database is provided, wherein the database is configured for storing measurement values received.

Storage of measurement values may make it possible to run series of measurements, wherein it may be decisive that measurement values consecutive in time be compared or evaluated. These values may be retrieved from a memory of a database any time after the measurement.

According to another exemplary embodiment of the present invention, a database is provided, wherein the database is designed for connection to a communication module. The adaptation to the communication module may enable a data exchange of measurement values between communication module and database. Thus, the functions of a measuring system may be distributed over various units. The communication module may be optimized for a transmission of the measurement values, whereas e.g. the database may be optimized for data storage.

According to another exemplary embodiment of the present invention, a database is provided, wherein the database comprises a displaying device, which is configured for displaying the measurement value. By the displaying device, stored measurement values can be retrieved from the database, in particular from a storage device of a database, viewed, and possibly evaluated according to predefined rules.

According to another exemplary embodiment of the present invention, a database is provided, wherein the interface of the database is written in a script language. By writing the interface in a script language it may be possible to flexibly adapt the communication with a communication module to possibly newly appearing demands. For example, it might be necessary for the storing to store new or other parameters of measurement values, whereby the information to be transmitted between communication module and database would have to be extended. By a higher level layer of an interface, written in a script language, it may be possible to respond to changes or new demands when transmitting measurement values.

According to another exemplary embodiment of the present invention, a database is provided, wherein the database can be connected to the communication module via a communication medium, selected from the group consisting of the Internet, a telephone network, and a direct link.

The communication module and the database may be locally distributed. The use of a communication medium between communication module and database may be implemented advantageously in particular for use as centralized data logging in a measuring scenario locally spaced far apart, as it may occur e.g. on large factory premises

BRIEF DESCRIPTION OF THE DRAWINGS

Hereafter, advantageous exemplary embodiments of the present invention will be described with reference to the figures:

FIG. 6 shows an initialization script for a script case according to an exemplary embodiment of the present invention.

FIG. 7 shows a database interface in a script language according to an exemplary embodiment of the present invention.

FIG. 9 shows a script for interrogating a database according to an exemplary embodiment of the present invention.

DETAILED DESCRIPTION OF EXEMPLARY EMBODIMENTS

Illustrations in the figures are schematic and not to scale. In the following description of FIG. 1 to FIG. 10, the same reference signs are used for like or corresponding elements.

Figure 1:
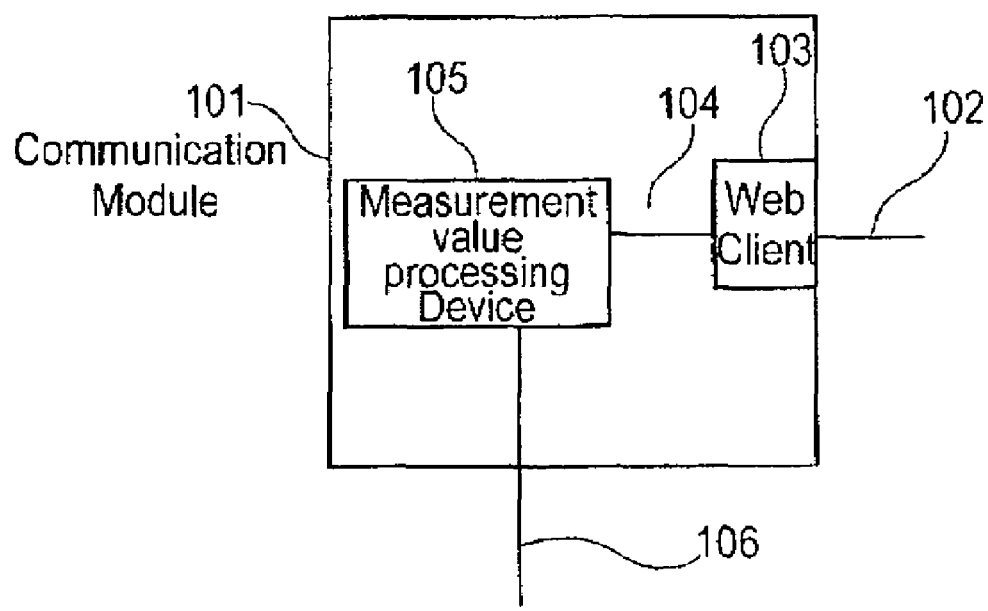
FIG. 1 shows a functional diagram of a communication module according to an exemplary embodiment of the present invention.

FIG. 1 shows a functional diagram of a communication module according to an exemplary embodiment of the present invention. The communication module 101 comprises a measurement value processing device 105 and a web client 103. The measurement value processing device 105 is connectable to a measuring instrument via a first interface 106. For this purpose, the first interface 106 is e.g. a bus protocol, such as I²C, HART®, Profibus, Fieldbus Foundation™, or VEGA VBUS. Thus, via the first interface 106 a connection to any measuring instrument, which has a corresponding bus, can be set up.

The measuring instrument can be arranged remote from the communication module 101, and consequently is not represented in FIG. 1. Communication between communication module 101 and a measuring instrument is performed via the first interface 106. In this case, the measurement values of the measuring instrument reach the measurement value processing device 105 of the communication module 101.

In the measurement value processing device 105, the measurement values received are prepared for transmission. That is, format adaptation or evaluation of the measurement values is taking place. Via the internal link 104, which connects the measurement value processing device 105 and the web client 103, the edited measurement data or the data to be transmitted are forwarded to the web client 103. The web client 103 is located near the interface 102, to which the web client 103 is linked.

Inside the web client 103, further editing of the data in a data format transmissible via the communication medium is taking place. For this purpose, the data is converted e.g. into a script format, into a script readable format or into a hypertext transfer protocol syntax. The web client 103 is linked to the second interface 102 of the communication module 101, and can make the data edited in script form available for another application via the second interface 102.

In FIG. 1, such an application is not shown. Such an application can be e.g. a database with a correspondingly adapted interface. In this case, the interface of the database should communicate directly or via a communication medium with the second interface 102 and understand the message format edited by the web client.

The memory application can be remote from the communication module 101. In order to be still able to communicate with the application, the second interface 102 is not linked directly to the application, but is connected to a communication medium. A communication medium can be e.g. a telephone network, a direct link, or the Internet. Via such a communication medium, a locally remote communication between a database and the communication module 101 can take place.

Figure 2:
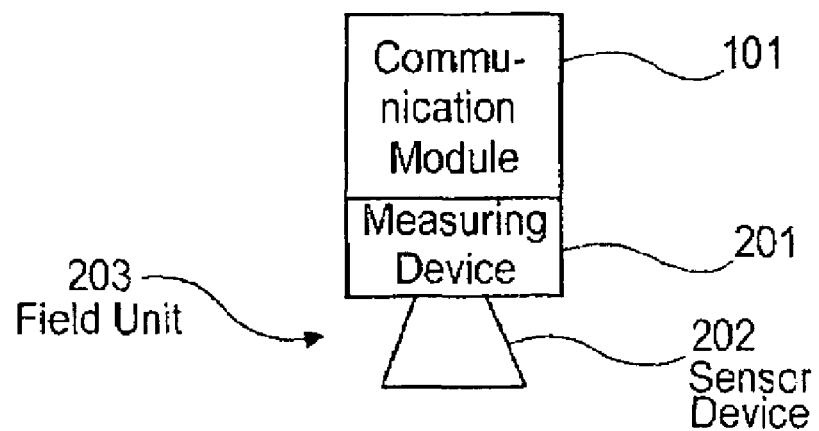
FIG. 2 shows a schematic illustration of a measuring instrument with an integrated communication module according to an exemplary embodiment of the present invention.

FIG. 2 shows a schematic illustration of a measuring instrument assembly, i.e. of a measuring instrument with an integrated communication module according to an exemplary embodiment of the present invention. In FIG. 2, the communication module 101 is linked directly to the measuring device 201 of a measuring instrument or sensor 203. The measuring device 201 and the sensor device 202 together form the measuring instrument 203, the sensor 203 or the field unit 203.

The physically integrating link between communication module 101 and sensor 203 can be made e.g. via a screwed joint, wherein the communication module 101 and the measuring device 201 respectively have an adapted thread. The communication link between communication module 101 and sensor 203 can be performed by the second interface of the communication module 101 (not shown in FIG. 2). The communication module 101 can directly tap a measurement value from the measuring device 201. The measurement value, which is made available at the measuring device 201, is an edited value of a physical process quantity measured by the sensor device 202.

Due to the direct link of the measuring instrument 203, e.g. of level or pressure measuring instrument, a measuring instrument 203, that has no communication module, can be retrofitted with a communication module 101 and made suitable for connection to a database.

Figure 3:
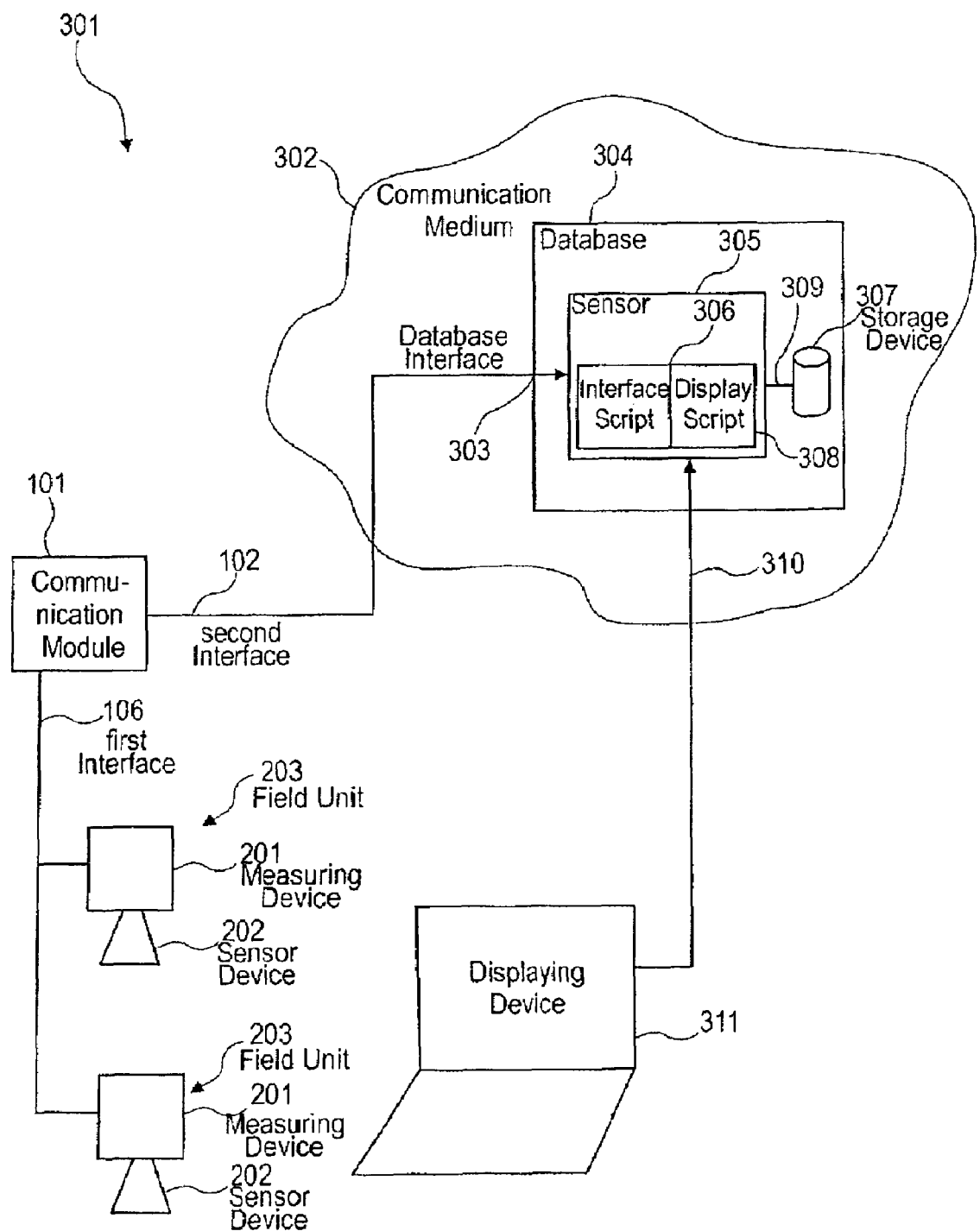
FIG. 3 shows the schematic illustration of a measurement value logging system according to an exemplary embodiment of the present invention.

FIG. 3 shows the schematic illustration of a measurement value logging system according to an exemplary embodiment of the present invention. The measurement value logging system 301 comprises a communication module 101 and a database 304. The communication module 101 is linked via the second interface 102 of the communication module 101 to the interface 303 of the database 304. Transmission is taking place via a communication medium 302, as e.g. the Internet, an intranet, the telephone network, or a direct link. As a physical link with the communication medium 302, for both interfaces 102 and 303, e.g. a RS232 link, a modem link, or an Ethernet link, can be used.

Measurement values are supplied from both measuring instruments 203 composed of a sensor device 202 and a measuring device 201. The measuring instruments 203 are linked via a first interface 106 to the communication module 101. They supply their determined process quantities via the first interface 106 to the communication module 101. The first interface 106 can be e.g. a HART®, Profibus, Fieldbus Foundation™, or VEGA VBUS. The communication of the measurement values from the measuring instruments 203 to the communication module 101 can take place independently from another communication relation, e.g. the communication between the communication module 101 and the database 304.

Instead of a measuring instrument 203 it is also possible to connect an evaluation unit 203 to a communication module 101. Such an evaluation unit is available e.g. as VEGALOG 571, VEGAMET 515, or VEGAMET 624, of the VEGA company. The object of an evaluation unit is in general to connect analog measuring instruments or sensors to a digital decentralized evaluation system. The evaluation system can be e.g. the database 304 together with the associated server 305.

The analog sensors have no digital interfaces, and therefore at first, they cannot be connected directly to a digital bus system. However, sensors with an analog interface can be connected to the evaluation unit. The evaluation unit gathers the analog data of the analog measuring instruments or the analog sensors and converts it into digital signals, which are distributed via the digital bus system 102 or 106 e.g. to a database. Herein, with respect to the analog measuring bus protocol and the digital measuring bus protocol, the evaluation unit plays the part of a protocol conversion or gateway function. Furthermore, for a plurality of connected analog measuring sensors, it packs up the individual analog measuring parameters provided, in order to dispatch them as multiplexed into one digital stream.

An example of a digital bus system 106, by which the evaluation unit can be connected to the communication module 101, is the VEGA Protocol DISBUS or LOGBUS. However, any known measuring bus system can be used.

However, it can also be envisaged for the evaluation unit to comprise in addition to the analog interface for connection of the analog measuring instruments an interface for connection to a communication network 302, e.g. an Ethernet interface. If the evaluation unit itself comprises in addition the communication module, then the evaluation unit can be connected to the database without the need of using a separate communication module. That is, the evaluation unit, in particular the communication module integrated therein, can communicate directly with the database.

The communication module 101 can also be used in a measuring system of modular design. For this purpose, the communication module 101 can be configured e.g. as a plug-in card, which can be plugged into a rack, and control within the rack the access of further modules or plug-in cards of the rack to the database.

The measurement values of the sensors 203 are conveyed in regular or irregular intervals to the communication module 101. The presence of a measurement value or of a new measurement value in the communication module 101 can be considered as an event, just like the expiration of a timing element in the communication module 101. Further events are falling below or exceeding a given measurement value or a failure of the sensor or the communication module. Each event can initiate a transmission of the measurement value from the communication module 101 to the database 304. The communication module 101 is e.g. a VEGAMET System of the VEGA company. A web client existing at the communication module 101 encodes the measurement values received via the first interface 106 into a form that is readable by the database 304 and transmittable throughout the network or communication medium 302.

For this purpose, the web client 103 at the communication module 101 e.g. converts existing information to be transmitted into a URI compliant syntax for transmission by using the hypertext transfer protocol (HTTP). For example, a result of a measuring instrument with the serial number 12345678, which was performed on channel 1 of the measuring instrument 203 and which supplies the value 38 on day TAG1, would be converted by the unit m at time 10:5:21 on Jul. 29, 2005 into the following syntax:

/vmi/vmi_input.php?sernum=12345678&channel=1&tag=TAG1&val=38&unit=m&date_time=2005-07-29 10:5:21.

The communication module 101 would transmit a TCP link to port 80 (http port) of the database, and once the link is set up, start its request with the http header "GET/vmi/vmi_input.php?sernum=12345678&channel=1&tag=TAG1&val=38&unit=m&date_time=2005-07-29 10:5:21 http/1.0". Instead of GET, other http transmission schemes, like POST or HEAD, are equally usable, too.

This script call can be conveyed to database 304 by using the HTTP protocol via the communication medium 302. A server 305 is connected to the physical interface 303 of the database. This server can be for instance the server family Apache, PHP and MySQL Server, or the server family IIS, SQL, ASP Server. In this case, the individual servers can respectively be stand-alone and distributed servers. Furthermore, as required, any combinations of the servers can occur.

On the server 305, which together with the storage device 307 forms the database 304, the interface script 306 and the display script 308 are running.

The web client implemented in the communication module 101 or in a field unit 101 transmits the information via a HTTP link to the server 305. On this server 305, the information of the interface script 306 (e.g. a CGI, PHP, or ASP script) is received. The values are then archived in the storage device 307 via the link 309. Thereby, the values are stored in the database 304.

The database 304 is located in the communication network 302. Thereby, e.g. a web hosting provider can operate the database 304 for the field unit 101. Due to the distribution of the communication module 101 and the database 304, each of the systems can be operated separately. The information of the field unit 203 or the information of the communication module 101 can be transmitted directly into the database 304. In this case, the communication module can monitor the success of this transmission or action and respond in case of error. The error is conveyed to the communication module by the database 304, in particular the server 305, via an erroneous CRC check sum feedback. When recognizing such an error, the communication module 101 can repeat the transmission. In case of success, the communication module 101 receives a "Done" notification.

The script 306 is for receiving the measurement values emitted by the communication module 101 and archiving or controlling of the archiving of the measurement values on the storage device 307.

In order to be able to interrogate or evaluate the values, in particular the measurement values, via link 310 a display unit 311 or displaying device 311 is connected to the database 304 and in particular to the display script 308 running on the server 305. The link 310 can be performed via the same communication medium 302 as the link between the communication module 101 and the database 304. In particular, the displaying device 311 and the database 304 can be connected via a direct link 310. For the display, the displaying device 311 can initiate the display script 308 on the server, e.g. by a web browser, and thus reading of the measurement values archived on the storage device 307 can be performed. By the display script 308 the measurement values can e.g. be converted into a given display format and put on display.

Figure 4:
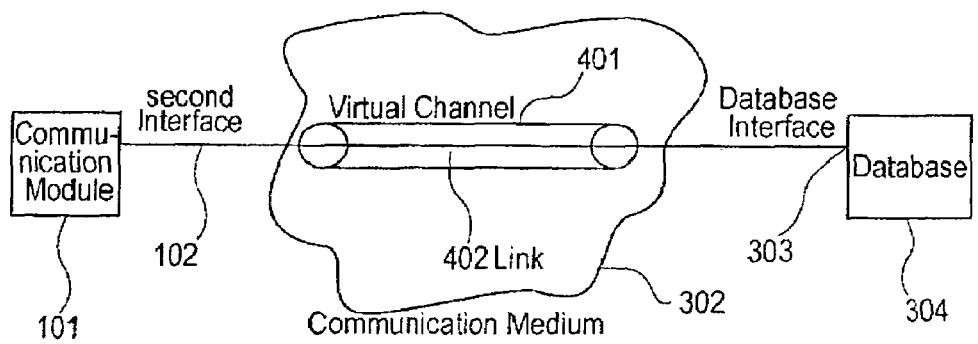
FIG. 4 shows the schematic illustration a link between a communication module and a database according to an exemplary embodiment of the present invention.

FIG. 4 shows a schematic illustration of a link between a communication module 101 and a database 304 according to an exemplary embodiment of the present invention. If as a communication medium 302, e.g. the Internet or an intranet is applied, all protection mechanisms, which are made available in an intranet or the Internet for protecting a data link, can be used. An example for one protection mechanism in an Internet or intranet 302 is the use of so-called virtual links 401 (VPN) or tunnels 401. Herein, the entries of the communication network 302, i.e. the links to the interfaces 102 and 303, continue in a virtual channel 401 as link 402.

Inside the tunnels, data can be encrypted. The use of a standard protocol like HTTP for measurement value transmission makes the transmission transparent for the network 302, whereby standard security procedures of the communication medium 302 can be used for the data links. The data backup via a virtual path 401 can thus be used without adaptation for the transmission of the measurement values from the communication module 101 to the database 304.

Figure 5:
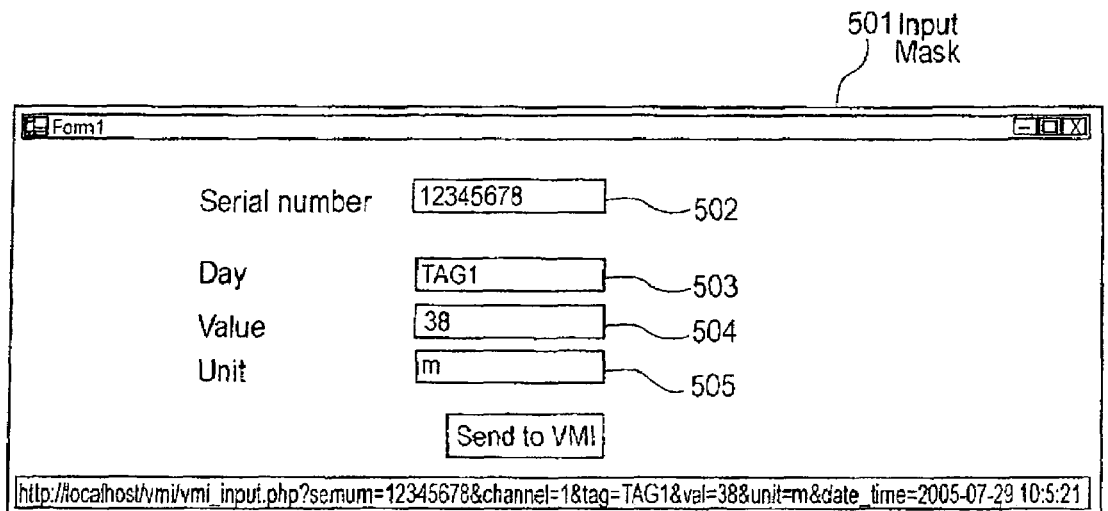
FIG. 5 shows an input mask for a script interface for transmission of information by a web client according to an exemplary embodiment of the present invention.

FIG. 5 shows an input mask for a script interface for transmission of information by a web client according to an exemplary embodiment of the present invention. For this purpose, in FIG. 5 the input mask 501 is shown. In the input mask 501, values can be specified. These values can be values to be transmitted. For example it can be a serial number 502, e.g. having the value 12345678. Another value can be a day 503 having the value TAG1. Another value to be transmitted could be the value 504 having the value 38, and finally, in the input mask 501, the unit 505 has to be specified, which can adopt the value m. Therefrom, based on these input values 502, 503, 504, 505, the web client creates the URI (Uniform Resource Identifier) notation adapted to the interface 306 for transmission over HTTP, which has the following format.

/vmi/vmi_input.php?sernum=12345678&channel=1&tag=TAG1&val=38&unit=m&date_time=2005-07-29 10:5:21.

The corresponding conversion of the provided values in the URI data format and subsequent communication over http is performed by the web client.

FIG. 6 shows an initialization script for a script file according to an exemplary embodiment of the present invention. For uniform representation, parameters required for the script files 306 and 308 can be grouped and made available in a configuration file. For example the variables $g_hostname, $g_port, $g_db_username, $g_db_password, and $g_database_name can be used. This allows for preallocation of the variables, e.g. with the values ---
$g_hostname="localhost"
$g_port=3306
$g_db_username="root"
$g_db_passwort=""
$g_database_name="vmi"
---

Thereby, the corresponding values under the designations are available to the script files.

FIG. 7 shows a database interface in a scripting language according to an exemplary embodiment of the present invention.

Figure 8:
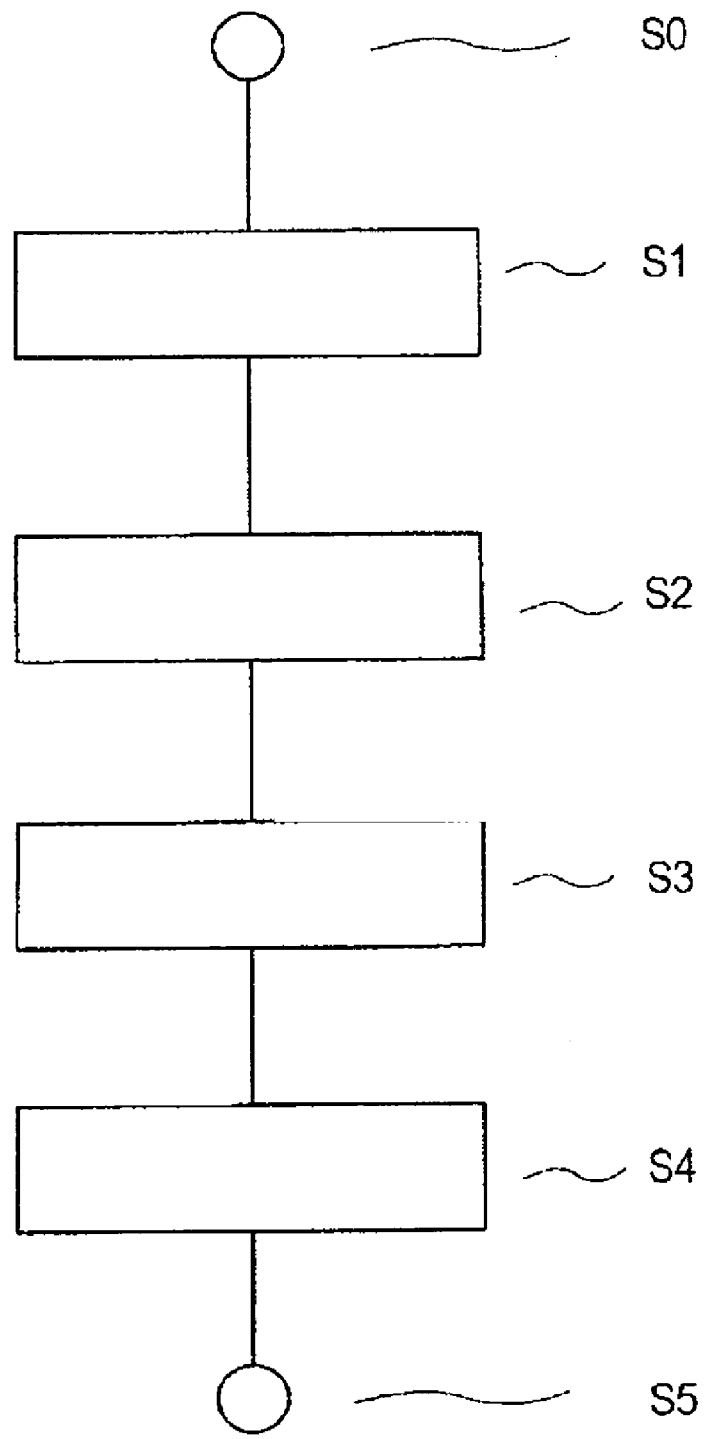
FIG. 8 shows a flowchart for the script of FIG. 7 according to an exemplary embodiment of the present invention.

FIG. 8 shows the flowchart belonging to FIG. 7. In FIG. 8 it can be seen that starting in an idle state S0, in the first step S1, an initialization of commonly used variables according to the configuration file described in FIG. 6 is taking place. Thereby, parameters are loaded in the script file.

In the subsequent step S2, a link to a database is opened, wherein at the same time, the availability of the database is checked. Upon opening of the link to the database, in step S3, a message is received by a web client, and the measurement values or other information values are extracted from the script file received or the composite address file.

In the next step S4, the extracted values are made available to the database 304 in predetermined locations of the storage device 307. After the values have been stored in the database in step S4, the process of FIG. 8 returns to idle state S5.

FIG. 9 shows a script for interrogating a database according to an exemplary embodiment of the present invention.

Figure 10:
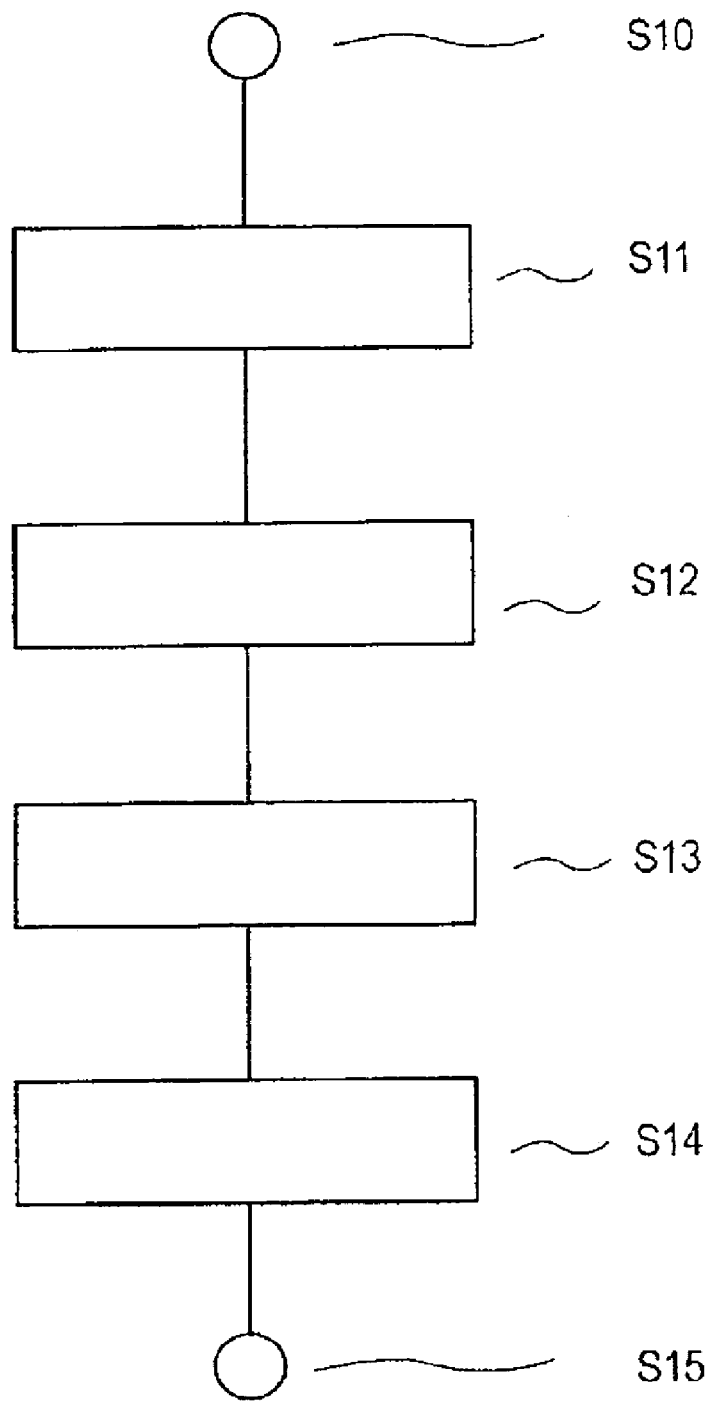
FIG. 10 shows a flowchart for the script of FIG. 9 according to an exemplary embodiment of the present invention.

FIG. 10 shows the flowchart belonging to FIG. 9. It can be seen from FIG. 10 that starting from an idle state S10, in step S11, a parameter initialization is taking place likewise by using the configuration file of FIG. 6. After this initialization the link to the database 304, in particular to the storage device 307 of the database, can be setup in step S12. At the same time, in step S12 the existence of the database is checked out.

In step S13 the desired information is read from the database 304, and in step 14 the information read, e.g. the measurement values or instants of measurement values, is represented in a manner defined in the script. After reading and representing the measurement values in step S14, the program returns to idle state S15.

Additionally, it is to be noted that "comprising" does not exclude any other items or steps, and that "a" or "an" do not exclude a plurality. Furthermore, it is to be noted that features or steps having been described with reference to one of the above exemplary embodiments can also be used in combination with other features or steps of other embodiments described above. Reference signs in the claims are not to be construed as limitations.

The communication module and the database have been described with reference to a pressure measuring instrument and a level measuring instrument. For one skilled in the art it is evident that the description refers to measuring instruments in general. Further examples of measuring instruments are thermometers, flow meters or gas meters.

The invention claimed is:

1. A measurement value logging system, comprising:
at least one communication module for a measuring instrument measuring one of a pressure and a level, comprising:
a processor;
a web client performed in the processor;
a processing device connected to the web client for preparing a transmission;
a first interface connected to the processing device; and
a second interface linked to the web client;
wherein the first interface is configured to connect to the measuring instrument to tap a measurement value from the measuring instrument;
wherein the second interface is configured to connect to a server connected to a database;
wherein the web client is configured to receive a measurement value via the first interface and the processing device;
wherein the web client is configured to edit the measurement value and encode the measurement value in a HTTP-header of a HTTP-request,
wherein the HTTP-header comprises at least one transmission scheme selected from the transmission schemes GET, POST, and HEAD;
wherein the web client is configured to transmit the measurement value via the second interface to the database by transmitting the HTTP-request to the server;
wherein the communication module is configured for forwarding the measurement value in an event-driven manner;
wherein the event is at least one event selected from a group of events consisting of the presence of a measurement value in the communication module, the expiration of a timing element in the communication module, falling below a given measurement value, exceeding a given measurement value, a failure of a sensor and a failure of the communication module;
wherein the first interface is selected from the group consisting of $I^2C$, HART®, Profibus, Fieldbus Foundation™, and VEGA VBUS;
and the logging system further comprising:
a database for a device which measures one of a pressure and a level, comprising:
a database interface;
a server; and
a storage device; and
wherein the server is configured to connect to the second interface of the communication module via the database interface,
wherein the server is configured to receive the HTTP-request includes the edited and encoded measurement value from the web client;
wherein the HTTP-header includes at least one transmission scheme selected from the transmission schemes GET, POST and HEAD;
wherein the database is configured to extract the measurement value from the HTTP-request, and the measurement value encoded in the HTTP-header of the HTTP-request;
wherein the database is adapted to archive the measurement value in the storage device; and
wherein the measurement value logging system is configured so that the communication module provides the database with measurement values by using the web client for logging at least one measurement value.

2. A measuring instrument assembly, comprising:
a measuring instrument logging a measurement value;
a communication module for a measuring instrument measuring one of a pressure and a level, comprising:
a processor; and a web client performed in the processor;
a processing device connected to the web client for preparing a transmission;
a first interface connected to the processing device;
a second interface linked to the web client;
wherein the first interface is configured to connect to the measuring instrument to tap a measurement value from the measuring instrument;
wherein the second interface is configured to connect to a server connected to a database;
wherein the web client is configured to receive a measurement value via the first interface and via the processing device;
wherein the web client is configured to edit the measurement value and to encode the measurement value in a HTTP-header of a HTTP-request,
wherein the HTTP-header comprises at least one transmission scheme selected from the transmission schemes GET, POST and HEAD; and
wherein the web client is configured to transmit the measurement value via the second interface to the database by transmitting the HTTP-request to the server;
wherein the communication module is configured for forwarding the measurement value in an event-driven manner;
wherein the event is at least one event selected from the group of events consisting of the presence of a measurement value in the communication module, the expiration of a timing element in the communication module, falling below a given measurement value, exceeding a given measurement value, a failure of a sensor and a failure of the communication module;
wherein the first interface is selected from the group consisting of $I^2C$, HART®, Profibus, Fieldbus Foundation™, and VEGA VBUS; and
wherein the communication module is integrated into the measuring instrument by a physically integrating link.

3. The communication module of claim 2,
wherein the physically integrating link is a screwed joint.

4. A communication module for a measuring instrument measuring one of a pressure and a level, comprising:
a processor; and
a web client performed in the processor;
a processing device connected to the web client, the processing device preparing a transmission;
a first interface connected to the processing device; and
a second interface linked to the web client,
wherein the first interface is configured to connect to the measuring instrument to tap a measurement value from the measuring instrument;
wherein the second interface is configured to connect to a server connected to a database;
wherein the web client is configured to receive a measurement value via the first interface and processing device;
wherein the web client is configured to edit the measurement value and encode the measurement value in a HTTP-header of a HTTP-request;
wherein the HTTP-header includes at least one transmission scheme selected from the transmission schemes GET, POST, and HEAD;
wherein the web client is configured to transmit the measurement value via the second interface to the database by transmitting the HTTP-request to the server,
wherein the communication module is configured to forward the measurement value in an event-driven manner,
wherein the event is at least one event from a group of events consisting of the presence of a measurement value in the communication module, the expiration of a timing element in the communication module, falling below a given measurement value, exceeding a given measurement value, a failure of a sensor, and a failure of the communication module, and
wherein the first interface is selected from a group consisting of $I^2C$, HART®, Profibus, Fieldbus Foundation™, and VEGA VBUS.

5. The communication module according to claim 4,
wherein the first interface is an interface internal to the measuring instrument.

6. The communication module according to claim 4,
wherein the second interface is written in a script language.

7. The communication module according to claim 4,
wherein the communication module connects to the database via at least one communication medium selected from the group consisting of the Internet, a telephone network, and a direct link.

8. The communication module according to claim 4,
wherein the web client is designed as a software module.

9. The communication module of claim 4, further comprising:
a thread forming a screwed joint with a thread of the measuring instrument.

10. A method for processing measurement values by a communication module, comprising:
receiving a measurement value from a measurement instrument at least at a first interface and via a processing device of the communication module;
wherein the first interface of the communication module is selected from the group consisting of $I^2C$, HART®, Profibus, Fieldbus Foundation™, and VEGA VBUS;
editing the measurement value and encoding the measurement value in a HTTP-header of a HTTP-request;
wherein the HTTP-header comprises at least one transmission scheme selected from the transmission schemes GET, POST and HEAD; and
forwarding the measurement value via a web client performed in a processor of the communication module to a second interface of the communication module, the second interface linked to the web client and forwarding the measurement value to a database connected to the second interface by transmitting the HTTP-request;
wherein the forwarding of the measurement value is carried out in an event-driven manner, and
wherein the event is at least one event selected from a group of events consisting of the presence of a measurement value in the communication module, the expiration of a timing element in the communication module, falling below a given measurement value, exceeding a given measurement value, a failure of a sensor and a failure of the communication module.

11. A database for a measuring instrument which measures one of a pressure and a level, comprising:
a database interface;
a server; and
a storage device,
wherein the server is configured to connect to a second interface of a communication module via the database interface,
the communication module further including
a processor;
a web client performed in the processor of the communication module;

a processing device connected to the web client for preparing a transmission, a first interface connected to the processing device;

a second interface linked to the web client;

wherein the first interface is configured to connect to the measuring instrument to tap a measurement value from the measuring instrument;

wherein the second interface is configured to connect to the server connected to a database;

wherein the web client is configured to receive a measurement value via the first interface and via the processing device;

wherein the web client is configured to edit the measurement value and to encode the measurement value in a HTTP-header of a HTTP-request, wherein the HTTP-header includes at least one transmission scheme selected from the transmission schemes GET, POST and HEAD;

wherein the web client is configured to transmit the measurement value via the second interface to the database by transmitting the HTTP-request to the server;

wherein the communication module is configured to forward the measurement value in an event-driven way; and wherein the event is at least one event selected from a group of events consisting of the presence of a measurement value in the communication module, the expiration of a timing element in the communication module, falling below a given measurement value, exceeding a given measurement value, a failure of a sensor and a failure of the communication module;

wherein the first interface being selected from the group consisting of $I^2C$, HART®, Profibus, Fieldbus Foundation™, and VEGA VBUS;

wherein the server is configured to receive the HTTP-request comprising an edited and encoded measurement value from the web client;

wherein the HTTP-header includes at least one transmission scheme selected from the transmission schemes GET, POST and HEAD;

wherein the database is configured to extract the measurement value from the HTTP-request and the measurement value encoded in the HTTP-header of the HTTP-request, and wherein the database is adapted to archive the measurement value in the storage device.

12. The database according to claim 11, further comprising:

a displaying device;

wherein the displaying device is configured to display the measurement value.

13. The database according to claim 11, wherein the database interface is written in a script language.

14. The database according to claim 11, wherein the database connects to the communication module via a communication medium selected from the group consisting of the Internet, a telephone network, and a direct link.

* * * * *